No. 613,979. Patented Nov. 8, 1898.
E. C. EAGLESFIELD.
CHECKING DEVICE.
(Application filed Oct. 28, 1897.)
(No Model.)
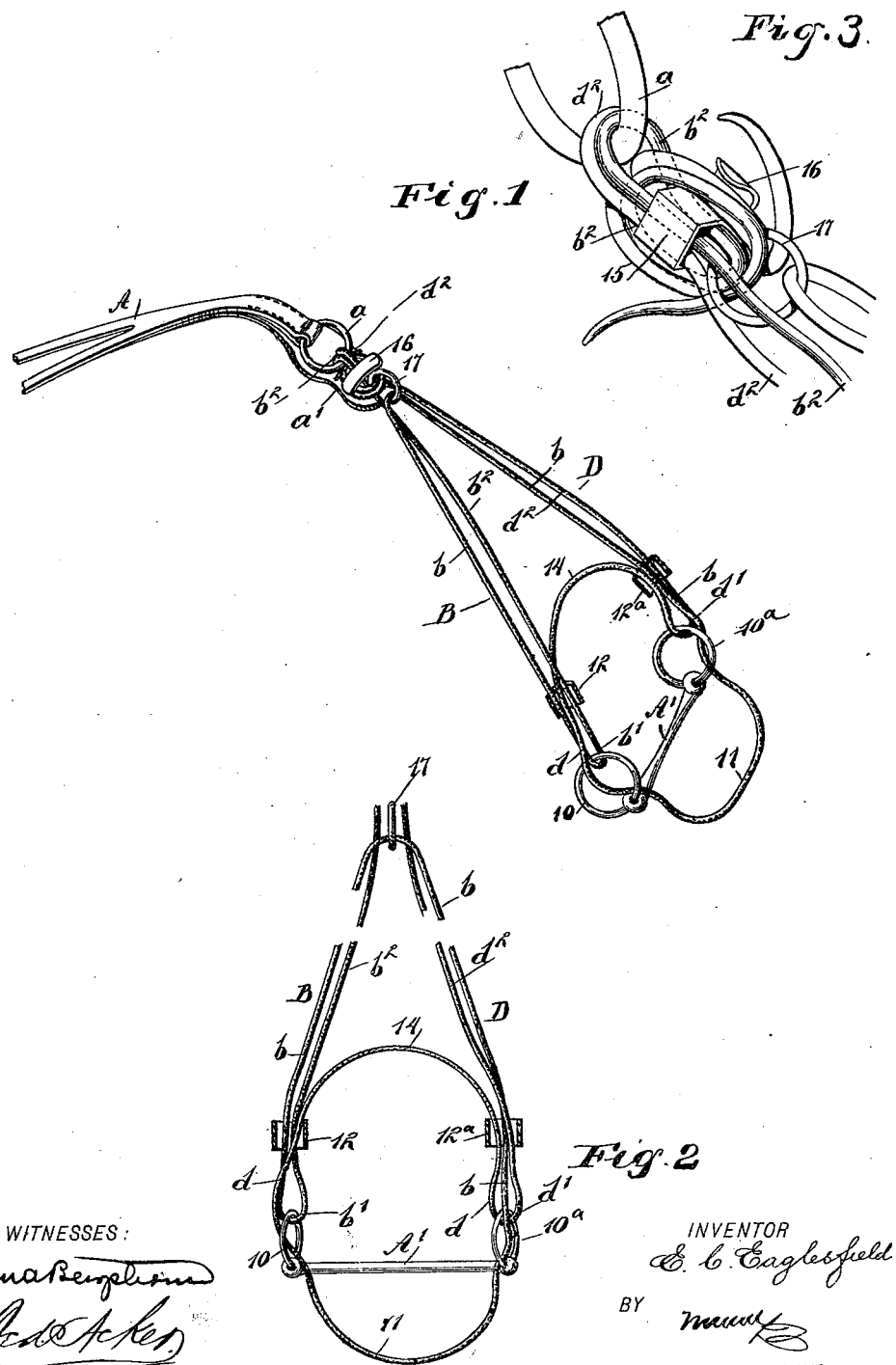
WITNESSES:
INVENTOR
E. C. Eaglesfield
BY
ATTORNEYS.

UNITED STATES PATENT OFFICE.

ELI C. EAGLESFIELD, OF BERLIN, WISCONSIN.

CHECKING DEVICE.

SPECIFICATION forming part of Letters Patent No. 613,979, dated November 8, 1898.

Application filed October 28, 1897. Serial No. 656,673. (No model.)

*To all whom it may concern:*

Be it known that I, ELI C. EAGLESFIELD, of Berlin, in the county of Green Lake and State of Wisconsin, have invented a new and Improved Checking Device for Horses, of which the following is a full, clear, and exact description.

My invention relates to a checking device for horses.
The object of the invention is to so construct the device that the horse to which the device is applied may render its use either easy or severe at will, a fact which the animal will very shortly learn.
A further object of the invention is to provide a checking device which will place the animal under control as soon as applied, preventing the animal from running, pulling to the side, or looking between the front legs, or executing other motions disagreeable to a rider or a driver and incident to a horse under excitement.

A further object of the invention is to provide a checking device so constructed that the animal's head need not be secured in a higher position than would be natural to him, but wherein should the head be checked higher the said checking device will not be unduly tight at any point.
The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a perspective view of the improved checking device, a part thereof being in section. Fig. 2 is a front elevation of the checking device, parts thereof being in section and parts broken away; and Fig. 3 is a detail view of the upper portion of the said device.
A represents the ordinary crotch-strap used in connection with all overdraw-check bridles, and A' represents a bit provided with the usual rings 10 and 10ª at its ends. The improved checking device is mainly constructed from a single piece of material in the form of a strap about seven feet long and of suitable thickness, the said strap being semicircular in cross-section or its edges are rounded off. The ends of the strap are passed upward through the rings 10 and 10ª of the bit, forming a loop below the bit, constituting a chin-strap 11.

Above each of the bit-rings a metal loop or sleeve is located, (designated, respectively, as 12 and 12ª,) and these loops or sleeves may be of any desired shape. That portion of the check-strap $b$ which is passed through the bit-ring 10ª is carried upward through the sleeve or loop 12ª above the said bit-ring 10ª and then through a ring 17 above the bit, which ring, when the device is in position on an animal's head, will be between the eyes. After the section $b$ of the check-strap has been passed through the ring 17 it is carried downward through the opposing loop or sleeve 12 and through the bit-ring 10, being bent upon itself after passing through the ring, as shown at $b'$, and then returned, as shown at $b^2$, upward through the loop or sleeve 12, substantially parallel with the strand $b$, passed downward through the same sleeve.

The portion $d$ of the check-strap which is passed through the bit-ring 10 is carried upward and across, yet above the bit, forming a nose-band 14, and through the sleeve 12ª, the lower end portion of the band being carried through the opposing bit-ring 10ª, forming a return portion $d'$ of the check-strap, this portion or member of the check-strap being then carried upward and again over the sleeve or loop 12ª, forming a side or cheek strand $d^2$, adjacent to the side or cheek strand $b$ at the same cheek-section of the device, the strand $b'$, as heretofore described, being likewise passed through the sleeve 12ª. The side strands or cheek-pieces $b^2$ and $d^2$ are carried upward through the upper sleeve or loop 15, provided with a top plate 16, whose ends project beyond the end portions of the loop or sleeve, as shown particularly in Fig. 3. The strands or end portions $d^2$ and $b^2$ of the cheek-strap are then carried through a ring $a$, attached to the forward extremity of the crotch-strap and having bearing on a suitable pad $a'$. After the strands $b^2$ and $d^2$ have been passed through the ring $a$ they are again passed through the loop or sleeve 15 and are carried in opposite directions through the ring 17 and a suitable number of times around the upper sleeve or loop 15 below the projecting plate, and the end portions of the strap are then carried in opposite directions through the bight formed by the passage of the strap through the ring $a$, the said end portions engaging firmly with the lower outer peripheral surface of the said ring $a$. Under this construction it will be observed that the chin-strap and nose-band are connected and are in the form of a sliding loop and that sliding or adjustable check-sections B and D are provided.

The strap, near its connection with the crotch-strap, may be loosened or tightened in an instant by drawing on the crotch-strap and the portions of the check-strap passed through the lower ring 17 or by manipulating the two straps which are passed through the upper loop or sleeve 15. To adjust the check, it is simply necessary to draw the chin-strap and nose-band in opposite directions until the space between them is sufficiently large to admit the horse's nose. The bit is then placed in the animal's mouth and the crotch-strap is drawn rearward to the harness and secured. In the event the animal be exceedingly unruly it is simply necessary to draw the side sleeves or loops upward until they practically meet at the center of the animal's forehead, whereupon the nose-band and chin-strap will be tightened to such an extent that the animal will be brought under complete control, although such an adjustment of the said side sleeves may never be needed.

Having thus described my invention, I claim as new and desire to secure by Letters Patent—

1. The combination, with a bit and sleeves located over the ends of the bit, of a check consisting of a strap passed through the rings of the bit and through the said sleeves, the strap in its passage through the rings of the bit being formed into a chin-strap, a nose-band and cheek-straps, and a fastening device for the ends of the strap located adjacent to the intersection of the cheek-straps at the upper portion of the device, for the purpose set forth.

2. The combination, with a bit and sleeves located over the ends of the bit, and a crotch-strap provided with a loop, of a check consisting of a strap passed through the rings of the bit and through the sleeves above the bit, the strap in its passage through the rings of the bit being formed into a chin-strap, a nose-band and cheek-straps, a ring through which the upper portion of a section of the cheek-straps is passed, and an adjusting-sleeve located between the said ring and the loop on the crotch-strap, the ends of the check-strap being passed through the adjusting-sleeve and the loop of the crotch-strap and adjustably secured upon the said adjusting-sleeve, as and for the purpose specified.

3. The combination, with the bit and the crotch-strap of a harness, sleeves located above the rings of the bit, an adjusting-sleeve located adjacent to the forward ends of the crotch-strap, and a ring placed adjacent to the said adjusting-sleeve, of a check consisting of a single piece of material, passed through the bit-rings and sleeves above said rings and looped through the upper ring, the end portions of the straps being connected with the crotch-strap and adjustably secured to the said upper sleeve, the arrangement of the straps being such as to form an adjustable nose-band, chin-strap and cheek-sections, as and for the purpose specified.

4. The combination, with a bit and a crotch-strap, of a check-strap comprising cheek-sections, a nose-band and a chin-strap, the said check-strap being constructed of a single piece of material, an adjusting device for the ends of the check-strap, and means, substantially as described, for connecting the check-strap with the crotch-strap, for the purpose set forth.

ELI C. EAGLESFIELD.

Witnesses:
CLARK PAGE,
A. MERDOCK.